Patented May 27, 1952

2,597,855

UNITED STATES PATENT OFFICE 2,597,855

PLASTICIZED POLYAMIDES AND METHOD OF PREPARATION

John D. Czarnecki, Oak Park, Ill., assignor to American Can Company, New York, N. Y., a corporation of New Jersey No Drawing. Application November 28, 1949, Serial No. 129,879

17 Claims. (Cl. 154—43)

This invention relates to plasticized linear polyamides and the method of preparation. More specifically, it relates to N-alkoxymethyl polyamides that are blended with 2,2-di-(phenoxy alkanol) propanes to produce homogeneous compositions.

The combination of N-alkoxymethyl polyamides with 2,2-di-(phenoxy alkanol) propanes results in a relatively heat stable substance of uniform composition. At room temperature the compositions are very tough, flexible, rubbery products with excellent adhesive qualities. These compositions can be converted into an infusible state by heating at relatively high temperatures for a long period of time or by addition of catalysts which effect the same result in a matter of minutes at the same temperature level.

An object of this invention is the preparation of a plasticized linear polyamide.

Another object is the production of a homogeneous composition comprising linear N-alkoxymethyl polyamides and 2,2-di-(phenoxy alkanol) propanes.

A further object is the preparation of a tough, rubbery composition having excellent adhesive properties for bonding wood, metals, fiber and other materials.

An additional object is the preparation of an infusible composition from the ingredients described above, for use as a solvent resistant adhesive.

Yet another object is a method of preparing a homogeneous plasticized linear N-alkoxymethyl polyamide by blending it with 2,2-di-(phenoxy alkanol) propanes.

Numerous other objects, advantages and uses of the invention will be apparent as it is better understood from the following description which is of a preferred embodiment thereof.

N-alkoxymethyl polyamides may be formed by reacting linear polyamides with formaldehyde and an alcohol in the presence of an oxygen containing acid having an ionization constant at least as great as $9.6 \times 10^{-6}$ and an equivalent conductance, measured at 25° C. in 0.01 N concentration, no greater than 370 ohm$^{-1}$.cm.$^{2}$. Detailed methods of their preparation are disclosed in T. L. Cairns Patents 2,430,860 and 2,441,057 and in the Journal of the American Chemical Society, vol. 71, No. 2, pp. 651–657, February 1949. These N-alkoxymethyl polyamides have an intrinsic viscosity of at least 0.4 and contain, as an integral part of the main polymer chain, recurring groups of the formula

which are separated by an average number of carbon atoms of at least 2 and wherein R represents an alkyl group containing less than 8 carbons, said groups constituting at least 10 per cent of the amide groups in the main polymer chain. In their unblended or unplasticized condition these polyamides may be dry granular particles.

The 2,2-di-(phenoxy alkanol) propanes may be prepared by reacting a sodium salt of an alkylidene bis phenol with an aliphatic halohydrin, preferably an olefine halohydrin, as described in the Coleman et al. Patent 2,331,265.

I have discovered that by adding finely divided linear N-alkoxymethyl polyamides in small increments to hot 2,2-di-(phenoxy alkanol) propanes the polyamides dissolve and disperse in the plasticizer. Upon cooling, the polyamide remains dispersed and is converted into a tough, rubbery, composition, having excellent adhesion to metal, wood, rubber and fiber. The composition is fusible and has a remarkable degree of heat stability. Tests have shown that the compositions are not affected markedly by exposure to air in a molten state for a period of seven days. This stability characteristic is very unusual for chemical compositions containing linear polyamides, especially N-alkoxymethyl polyamides.

The melting or softening points of my compositions varies from about room temperature to about 295° F. depending on the proportions of the ingredients. At N-alkoxymethyl polyamide concentrations between 32 and 33 per cent there is an unexpected sharp increase in melting point as determined by the Ball and Shouldered Ring Test, A. S. T. M. Designation E28–42T. The melting point as determined by the Dennis Bar method varies rather uniformly with increasing concentrations of polyamide and does not show any sharp breaks in ranges up to 40 per cent polyamide. This is clearly shown in Table 1.

Table 1

| Per cent by weight Polyamide | Per cent by weight 2, 2-di-(4-hydroxy-propoxy-phenyl) propane | Ball & Ring M. P. | Dennis Bar M. P. |
|---|---|---|---|
| | | °F. | |
| 28 | 72 | 155 | |
| 31 | 69 | 181 | 206 |
| 32 | 68 | 189 | 211 |
| 33 | 67 | 289 | 215 |
| 34 | 66 | 293 | 218 |
| 35 | 65 | 295 | 224 |
| 40 | 60 | | 290 |

My compositions are well suited as bonding materials for interfolded side seams of sheet metal containers regardless of whether the sheet metal is enameled or coated steel or tin plate or whether the plate is uncoated. Excellent bonds are also produced to aluminum, copper and bronze surfaces. The cohesive strength of the linear N-alkoxymethyl polyamide - 2,2 - di(phenoxy alkanol) propane compositions and their adhesive strength to metals are sufficiently great to eliminate the use of solder or other bonding agents heretofore used and still provide a container that compares favorably with soldered cans.

Linear N-alkoxymethyl polyamides are soluble in hot alcohols and solutions of the polyamides have been suggested as adhesive materials. The use of such solutions is undesirable as a side seam cement for containers because they require virtually complete evaporation of the solvent before proper bonding strength is attained. Also, traces of solvent may impart an objectionable odor or flavor to food materials packed in such containers. In addition, a solvent for the polyamide cannot be packed in the container. I have found that my compositions can be cured or rendered infusible after plasticizing so that they become resistant to solvents for linear N-alkoxymethyl polyamides. Cured films are softened slightly by these solvents but are not dissolved. The adhesive properties of the cured compounds are not affected noticeably by such solvents.

The N-alkoxymethyl polyamides when blended with 2,2-di-(phenoxy alkanol) propanes overcome all the objections that are present when solutions are used as side seam cements. Because they are heat stable, the compositions may be deposited onto the marginal edges of a piece of sheet metal that will be utilized in forming the side seam of a container. The application can be made as a hot melt, preferably under pressure of a gas such as nitrogen, at temperatures above the melting point and as high as 400° F. or even higher. After deposition of the compound, the side seam can be assembled by any of the well known methods as, for example, by interfolding the marginal edges and then bumping them together. The laps of the containers may be welded after assembly of the side seams, if desired. The compound is then allowed to cool and set. The composition may also be deposited onto container ends for use as a gasket material in end seams.

I have experimented with a large variety of polyamides among which are nylon FM1001, FM3001, FM6001, FM6501; polyamides formed by reacting partially polymerized vegetable fatty acids with amines (such as Norelacs); and N-alkoxymethyl polyamides. The N-alkoxymethyl polyamides are the only materials of this type, as far as I have been able to ascertain, that are plasticized by 2,2-di-(phenoxy alkanol) propanes to yield flexible, tough, rubbery compositions.

I have also tested numerous plasticizers and found that only 2,2-di-(4-hydroxy-propoxy-phenyl) propane having the formula

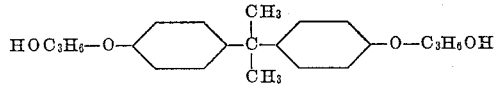

is satisfactory when used alone. N-alkoxymethyl polyamides are dissolved and dispersed by the 2,2-di-(4-hydroxy-propoxy-phenyl) propane to produce compounds that are useful, as one example, as bonding agents for flexible sheet materials. The polyamides of the FM type and those formed by reacting partially polymerized vegetable fatty acids and amines (Norelacs) are also dispersed by hot 2,2-di-(2-hydroxy-propoxy-phenyl) propane, but, on cooling, they harden to yield a brittle material that does not have favorable adhesive qualities. Brittle end products are also formed when 2,2-di-(para hydroxy phenyl) propane is used to disperse N-alkoxymethyl polyamides. Hot 2,2-di-(beta-hydroxy-ethoxy-phenyl) propane having the formula

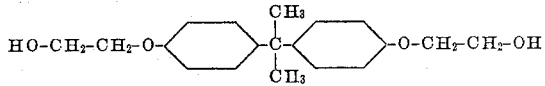

also dissolves and disperses N-alkoxymethyl polyamides, to form a soft, tough, non-self-supporting, tacky film. However, on aging the film blushes and finally turns brittle. Unsuccessful results were obtained with plasticizers such as hexaethylene glycol, polyethylene glycols of various molecular weights, polyethylene glycol di-2-ethyl-hexoate, diethyl succinate, diethyl sebacate, dibutyl and dimethyl phthalates, resorcinol, hydroquinone, furfuryl alcohol, hydroabietyl alcohol, octyl-phenoxy-diethoxy-ethanol and ortho and para toluene ethyl sulfonamides. A condensate of a 2-2-di-(4-epoxy-propoxy-phenyl) propane

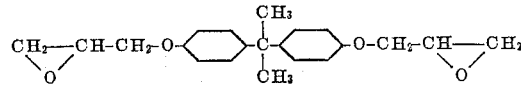

formed by reacting 2,2-di-(para hydroxy phenyl) propane with an epihalohydrin, does not dissolve and disperse N-alkoxymethyl polyamides when used alone, but it does improve the adhesive qualities when added in the proportion of 1 to 20 parts by weight to the N-alkoxymethyl polyamide - 2,2 - di - (4 - hydroxy - propoxy - phenyl) propane compound.

The N-alkoxymethyl polyamide content can vary over a range of 5 to 40 per cent. Above this range of N-alkoxymethyl polyamide content, the product is fairly viscous even at temperatures as high as 400° F. and is therefore difficult to extrude under relatively low imposed pressures in the order of 50 to 90 pounds per square inch. In the lower range of polyamide concentration, the composition remains soft and tacky. The composition having a polyamide content of from 5 to 20 per cent is a satisfactory adhesive for paper, cloth and other materials where a very high degree of bond strength is not required. The useful concentrations of ingredients for use as a side seam cement is between 20 and 35 per cent N-alkoxymethyl polyamide and between 65 and 80 per cent 2,2-di-(4-hydroxy-alkoxy-phenyl) propane. The preferred range for metal container manufacture is between 30 and 35 per cent N-alkoxymethyl polyamide and 65 and 70 per cent 2,2-di-(4-hydroxy-alkoxy-phenyl) propane.

I have found that the addition of stearamide in concentrations of 0.5 to 3 per cent by weight based on the weight of the polyamide-plasticizer mixture reduces the viscosity of my compositions at application temperature (350° to 400° F.), without appreciably affecting adhesiveness, and thus permits ready flow of the hot composition through a very narrow orifice at pressures as low as 50 pounds per square inch. The viscosity reducing substance is desirable from the standpoint of ease of workability of the compound, but it is not essential to successful formulation.

My N-alkoxymethyl polyamide-2,2-di-(4-hydroxy-propoxy-phenyl) propane compositions can be converted to an infusible state by prolonged heating in the order of 30 to 48 hours at temperatures between 350° and 450° F. The composition gradually gels and on continued heating is converted to a tough, infusible substance. The gelling can be retarded by small amounts, 0.5 to 3.0 per cent by weight, of orthodiphenyl-guanidine, phenyl biguanidine, alpha-naphthylamine, a liquid aryl sulfonamide-formaldehyde resin known as Santolite MHP, a liquid acetone aniline condensate and soya oil. In some instances an infusible product is desired, and this condition can be effected by adding minor amounts, 0.1 to 3.0 per cent, of catalysts, preferably after the blending of the polyamide and plasticizer has been completed.

The chemicals which act as curing catalysts are acids and acid anhydrides or compounds which are converted to acid reacting substances under the conditions of use. Among the materials which exert a catalytic effect are maleic anhydride, citric, tartaric, maleic, adipic, glycollic, hydrochloric, sulphuric and phosphoric acids. Other acids work equally well if the pH of the combined mixture, as measured by a water slurry, is reduced to a value as low as 4.0 to 4.5. Other compounds which act as catalysts are glyoxal and methylene bis (4 phenyl isocyonate). It is probable, but not certain, that the curing action is the result of cross-linking of the polyamide. Such cross-linking of the unplasticized polyamide polymers leads to loss of flexibility and elasticity. In my compositions, the cured products remain flexible and elastic, but are infusible and insoluble in the usual solvents for N-alkoxymethyl polyamides.

In addition to accelerating the rate of conversion to an infusible state, or curing of the compound, the catalysts will effect a cure at lower temperatures. At 350° F. the cure is effected in 1 to 15 minutes as compared to more than 48 hours at the same temperature for the non-catalyzed composition. The composition can be "surface cured" by exposing a film of material to vapors of the catalysts at temperatures as low as 180° F.

Fillers such as aluminum powder may be added. Other fillers and pigments may also be used.

In preparing these plasticized polyamide compositions particular care must be exercised. I have found that a homogeneous composition can be prepared by adding small increments of finely divided N-alkoxymethyl polyamide to hot plasticizer. If very coarse polyamide is used or if a finely divided polyamide is added in large amounts at one time, the polyamide is not completely dissolved or dispersed in the plasticizer. Polyamide particles larger than 8 mesh size are very difficult to dissolve and disperse and result in a non-uniform product. Stated differently, the particle size is important and it must be 8 mesh or under to produce a successful product. The following method steps have been repeatedly successful in producing a homogeneous final product.

1. Heat the plasticizer to a temperature of 350° to 400° F. This temperature range is slightly above the melting point of the N-alkoxymethyl polyamide.
2. Add a finely divided N-alkoxymethyl polyamide, 8 mesh or smaller, in small increments.
3. Stir or mix the plasticizer while adding the polyamide.
4. Continue stirring until the polyamide is completely dissolved and dispersed. Usually two hours at 350° to 400° F. is ample to complete the solution and dispersion.

Anti-gelling and viscosity reducing agents may be added while the materials are being blended. Curing catalysts are preferably added after solution and dispersion is completed.

The following examples which show parts by weight of the various ingredients illustrate my invention.

*Example 1*

| | Parts |
|---|---|
| N-methoxymethyl substituted polyhexamethylene adipamide | 5–40 |
| 2,2-di-(4-hydroxy - propoxy - phenyl) propane | 60–95 |

*Example 2*

| | Parts |
|---|---|
| N-methoxymethyl substituted polyhexamethylene adipamide | 33 |
| 2,2-di-(4-hydroxy-propoxy-phenyl) propane | 67 |
| O-diphenyl guanidine | 3 |

*Example 3*

| | Parts |
|---|---|
| N-methoxymethyl substituted polyhexamethylene adipamide | 30 |
| 2,2-di-(4-hydroxy-propoxy-phenyl) propane | 70 |
| O-diphenyl guanidine | 3 |

*Example 4*

| | Parts |
|---|---|
| N-methoxymethyl substituted polyhexamethylene adipamide | 33 |
| 2,2-di-(4 - hydroxy - propoxy - phenyl) propane | 67 |
| O-diphenyl guanidine | 3 |
| Stearamide | 1.5 |

*Example 5*

| | Parts |
|---|---|
| N-methoxymethyl substituted polyhexamethylene adipamide | 30 |
| 2,2-di-(4 - hydroxy - propoxy - phenyl) propane | 70 |
| O-diphenyl guanidine | 3 |
| 2,2-di-(4-epoxy-propoxy-phenyl) propane | 1–20 |

In these formulations other N-alkoxymethyl polyamides having the recurring grouping

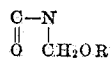

in which the alkyl group has less than 8 carbon atoms can be substituted for the N-methoxymethyl substituted polyhexamethylene adipamide. For example, N-methoxymethyl polyhexamethylene sebacamide is a satisfactory substitute for N-methoxymethyl polyhexamethylene adipamide. Other N-alkoxymethyl substituted fiber forming linear polyamides are also satisfactory. Mixtures of N-alkoxymethyl polyamides can also be used. The preferred polymers are N-methoxymethyl substituted polyhexamethylene adipamides, having acetone dilution values of 45 to 55.

It is thought that the invention and many of its attendant advantages will be understood from the foregoing description, and it will be apparent that various changes may be made in the choice of the ingredients, their proportions and their method of preparation without departing from the spirit and scope of the invention or sacrificing all of its material advantages, the form hereinbefore described being merely a preferred embodiment thereof.

I claim:

1. A plasticized composition comprising from about 5 per cent to about 40 per cent by weight of an alkoxymethyl substituted linear polyamide having recurring

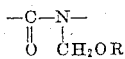

groups separated by at least 2C atoms wherein R represents an alkyl group of less than 8 carbon atoms and from about 60 per cent to about 95 per cent by weight of a plasticizer comprising 2,2-di-(4-hydroxy-propoxy-phenyl) propane.

2. A plasticized composition comprising from about 5 per cent to about 40 per cent by weight of an alkoxymethyl substituted linear polyamide having an intrinsic viscosity of at least 0.4 and containing as an integral part of the main polymer chain recurring

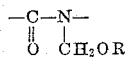

groups separated by at least 2C atoms wherein R represents an alkyl group of less than 8 carbon atoms and from about 60 per cent to about 95 per cent by weight of a plasticizer comprising 2,2-di-(4-hydroxy-propoxy-phenyl) propane.

3. A plasticized composition comprising from about 5 per cent to about 40 per cent by weight of a methoxymethyl substituted linear polyamide having recurring

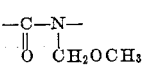

groups separated by at least two carbon atoms and from about 60 per cent to about 95 per cent by weight of a plasticizer comprising 2,2-di-(4-hydroxy-propoxy-phenyl) propane.

4. A plasticized composition comprising from about 5 per cent to about 40 per cent by weight of a methoxymethyl substituted linear polyhexamethylene adipamide and from about 60 per cent to about 95 per cent by weight of a plasticizer comprising 2,2-di-(4-hydroxy-propoxy-phenyl) propane.

5. A composition comprising from about 5 per cent to about 40 per cent by weight of a linear polyhexamethylene adipamide in which at least 10 per cent of hydrogen atoms in the amide groups in the main polymer chain are substituted by methoxymethyl groups and from about 60 per cent to about 95 per cent by weight of a plasticizer comprising 2,2-di-(4-hydroxy-propoxy-phenyl) propane.

6. A homogeneous composition comprising from about 5 to about 40 per cent by weight of a methoxymethyl substituted linear polyhexamethylene adipamide and from about 60 to about 95 per cent by weight of 2,2-di-(4-hydroxy-propoxy-phenyl) propane.

7. A homogeneous composition comprising from about 25 to about 35 per cent by weight of a methoxymethyl substituted linear polyhexamethylene adipamide and from about 65 to about 75 per cent by weight of 2,2-di-(4 hydroxy-propoxy-phenyl) propane.

8. The method of preparing a homogeneous, plasticized linear N-alkoxymethyl polyamide having recurring

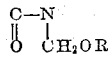

groups separated by at least two carbon atoms in which R represents an alkyl group having less than 8 carbon atoms, comprising heating the plasticizer to a temperature at least as high as the melting point of the N-alkoxymethyl polyamide, adding the polyamide having a maximum particle size of about 8 mesh in small increments with stirring to effect rapid solution and dispersion of the polyamide in the hot plasticizer, and continuing the heating and stirring until the polyamide is completely dissolved and dispersed.

9. The method of preparing a homogeneous plasticized polyamide which comprises heating 2,2-di-(4-hydroxy-propoxy-phenyl) propane as plasticizer to a temperature at least as high as the melting point of the polyamide, adding an N-methoxymethyl substituted linear polyhexamethylene adipamide having a maximum particle size of about 8 mesh in small increments to the hot plasticizer, and maintaining the temperature with stirring until the polyamide is dissolved and dispersed.

10. The method of preparing a homogeneous plasticized polyamide which comprises heating the plasticizer comprising 2,2-di-(4-hydroxy-propoxy-phenyl) propane to a temperature of 350°–400° F., adding in small increments an N-methoxymethyl substituted linear polyamide having recurring

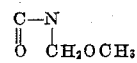

groups separated by at least two carbon atoms and having a maximum particle size of about 8 mesh, and maintaining the temperature with stirring until the polyamide is completely dissolved and dispersed in the plasticizer.

11. The method of preparing a homogeneous plasticized polyamide which comprises heating the plasticizer comprising 2,2-di-(4-hydroxy-propoxy-phenyl) propane to a temperature of 350°–400° F., adding a linear N-methoxymethyl polyhexamethylene adipamide having a maximum particle size of about 8 mesh in small increments, and maintaining the temperature with stirring until the polyamide is completely dissolved and dispersed in the plasticizer.

12. A plurality of metal layers having the composition of claim 7 between adjacent surfaces of said layers as a bonding material.

13. A plurality of tin plate layers having the composition of claim 7 between adjacent surfaces of said layers as a bonding material.

14. A plurality of steel layers having the composition of claim 7 between adjacent surfaces of said layers as a bonding material.

15. A metal container having the composition of claim 7 interposed between interfolded metal layers composing the container seams.

16. A homogeneous composition comprising from about 25 to about 35 per cent by weight of a methoxymethyl substituted linear polyamide having an intrinsic viscosity of at least 0.4 and containing as an integral part of the main polymer chain recurring

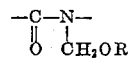

groups separated by at least 2C atoms wherein R represents an alkyl group of less than 8 carbon atoms, from about 65 to about 75 per cent by weight of a plasticizer comprising 2,2-di-(4-hydroxy-propoxy-phenyl) propane, and from about 1 to about 20 parts by weight based on the weight of polyamide and plasticizer mixture of a reaction product of 2,2-di-(para-hydroxy-phenyl) propane and an epihalohydrin.

17. A homogenous composition comprising from about 25 to about 35 per cent by weight of a methoxymethyl substituted linear polyhexamethylene adipamide, from about 65 to about 75 per cent by weight of 2,2-di-(4-hydroxy-propoxyphenyl) propane and from about 0.5 to about 3 per cent by weight, based on the weight of the polyhexamethylene adipamide-2,2-di-(4-hydroxy-propoxy-phenyl) propane mixture, of an anti-gelling agent comprising a diphenyl guanidine.

JOHN D. CZARNECKI.

REFERENCES CITED

The following references are of record in the file of this patent:

UNITED STATES PATENTS

| Number | Name | Date |
|---|---|---|
| 2,191,367 | Carothers | Feb. 20, 1940 |
| 2,279,774 | Bolton | Apr. 14, 1942 |
| 2,456,344 | Vaala | Dec. 14, 1948 |